June 24, 1930.                J. N. NELSON                1,767,807
                           OPHTHALMIC MOUNTING
                            Filed July 10, 1928
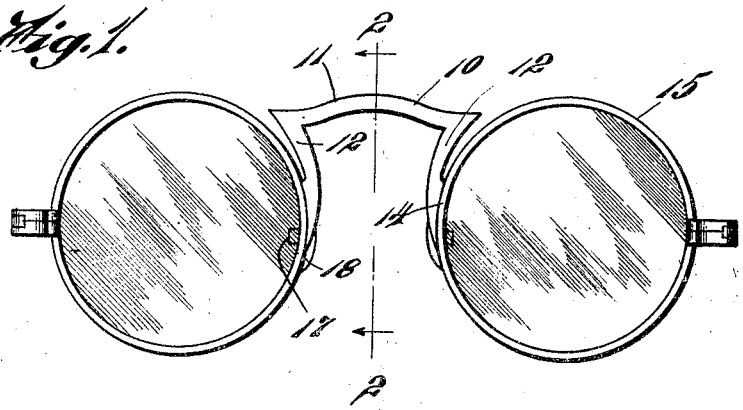
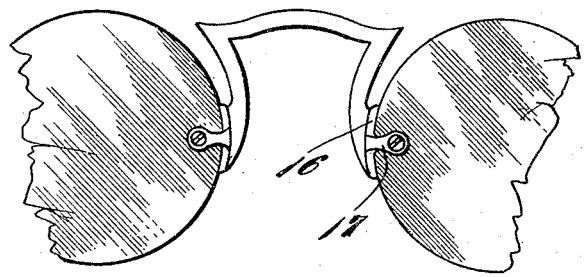
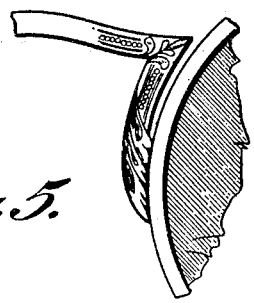
INVENTOR.
John N. Nelson.
BY Barlow & Barlow
ATTORNEYS.

Patented June 24, 1930

1,767,807

UNITED STATES PATENT OFFICE

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND

OPHTHALMIC MOUNTING

Application filed July 10, 1928. Serial No. 291,577.

This invention relates to an improved construction of ophthalmic mounting; and has for its object to provide in such a mounting a bridge member having a cross bar with inwardly curved downwardly-extending resilient side arms of a length substantially one-half the diameter of the lenses to which the bridge member is attached, these arms each having an extended attaching surface at its lower portion by which the bridge member may be securely attached to the lens-carrying member.

With these and other objects in view, the invention consists of certain novel features of construction, as will be more fully described, and particularly pointed out in the appended claims.

In the accompanying drawings:

Fig. 1 shows a bridge of my improved construction with its elongated raised attaching portion as connected to eyewires.

Fig. 2 is a section on line 2—2 of Fig. 1.

Fig. 3 shows the bridge member detached with elongated raised bosses on the outer surface of the side arms.

Fig. 4 shows my improved form of bridge member with the elongated bosses on its side arms attached to lens clamps.

Fig. 5 shows the elongated raised boss portion as presenting a broad surface adapted for ornamental decoration.

It is found in practice of advantage to provide a bridge member which has relatively long side arms, and in order to securely connect these long arms to the lens-carrying members such as the eyewire or lens clamp it is necessary that an elongated attaching surface be provided that is preferably raised from the plane of the curved upper contour of the arm, this raised portion being of a length sufficient to permit these long arms to be securely attached to the lens-carrying members at the center or above or below the center, and to accomplish this in a simple and effective way, I have formed bosses raised from the outer surface of the arms, the attaching surfaces of the bosses being substantially one-half the length of the arms, and the length of the arms being substantially one half the diameter of the lens to which they are attached; and the following is a detailed description of the present embodiment of my invention and showing one construction of bridge member by which these advantageous results may be acomplished:

With reference to the drawings, 10 designates the bridge member having a cross bar 11 and downwardly-extending side arms 12 inwardly curved to more or less conform to the general design and curvature or contour of the adjacent edges of the lenses or eyewires. These arms 12 are of a length substantially one half the diameter of the lens, or of the outer diameter of the eyewire when the lens is mounted in an eyewire.

The lower portion of each of these arms is provided with a laterally-extending boss 13 adjacent its lower portion raised from the plane of the curved upper portion of the arm and providing an extended attaching portion of a length substantially one-half the length of its arm. To this raised attaching portion may, in some instances be soldered as at 14, the eyewire 15, while in other instances to this raised portion may be soldered the saddle portion 16 of the lens clamp 17, whereby sufficient surface is presented by which these elongated arms may be securely attached to the lens-connecting member. The point of attachment may be on or above or below a center line thru the lenses.

Another advantage in providing these raised portions or bosses on the lower ends of the side arms 12 is that the broad surface is adapted to receive ornamentation.

To the lower ends of these bridge arms I also attach a bendable arm 17 to which a noseguard 18 is attached whereby these noseguards may be bent toward or from each other to cause the mounting to better fit the face of the wearer.

My improved construction of bridge member is very handsome and attractive in appearance and by forming an extended attaching surface the mounting is rendered very strong and durable.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ophthalmic mounting comprising a bridge member having a cross bar with inwardly-curved downwardly-extending side arms of a length substantially one-half the height of the lenses to which they are attached, lens attaching members, said arms each having an integral projection on its lateral edge at its lower portion provided with an extended attaching surface connected to its lens attaching member.

2. An ophthalmic mounting comprising a bridge member having a cross bar with inwardly-curved downwardly-extending substantially rigid side arms of a length substantially one-half the height of the lenses to which they are attached, said arms each having an integral extended attaching boss at its lower portion laterally extending from its edge, the attaching face of said boss being curved to conform substantially to the curvature of the adjacent portion of the lens and to its connecting surface of the lens attaching member.

3. An ophthalmic mounting comprising a bridge member having a cross bar with inwardly-curved downwardly extending side arms of a length substantially one half the height of the lenses to which they are attached, said arms each having a lateral boss with an integral extended attaching surface at the lower ends thereof, a portion of said surfaces being located below and a portion above the medial line through the lenses.

4. An ophthalmic mounting comprising a cutout bridge member having a cross bar with inwardly-curved downwardly extending side arms rigid with the bridge of a length substantially one half the height of the lenses to which they are attached, said arms normally extending parallel to, and spaced from, said lenses, and an extended attaching surface projecting from the lateral edge of each arm at the lower end thereof and of a length substantially one-half the length of said arms.

In testimony whereof I affix my signature.

JOHN N. NELSON.